US008826144B2

(12) United States Patent
Joret et al.

(10) Patent No.: US 8,826,144 B2
(45) Date of Patent: Sep. 2, 2014

(54) CONTENT RECOVERY MODE FOR PORTLETS

(75) Inventors: Jean-Baptiste Joret, Styttgart (DE); Timo Kussmaul, Boeblingen (DE); Jan Engehausen, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1941 days.

(21) Appl. No.: 11/421,872

(22) Filed: Jun. 2, 2006

(65) Prior Publication Data

US 2006/0277199 A1 Dec. 7, 2006

(30) Foreign Application Priority Data

Jun. 3, 2005 (EP) ..................................... 05104871

(51) Int. Cl.
*G06F 3/00* (2006.01)
(52) U.S. Cl.
USPC ..................... 715/742; 707/999.01
(58) Field of Classification Search
USPC ............................................ 715/742; 707/10
See application file for complete search history.

(56) References Cited

U.S. PATENT DOCUMENTS

| 6,289,333 | B1 | 9/2001 | Jawahar et al. |
| 6,476,827 | B1 * | 11/2002 | Porter ........................... 715/738 |
| 2004/0243928 | A1 * | 12/2004 | Hesmer et al. ................ 715/505 |

OTHER PUBLICATIONS

Abdelnur et al. (Portlet Specification Version 1.0)., Jul. 9, 2003.*
Diaz et al.;Turning Web Applications into Portlets: Raising the Issues; © 2005; IEEE; 7 pages.*
"Portal User Session Hibernation," IP.Com Journal, IP.COM Inc., West Henrietta, NY, Feb. 20, 2003.
Will, R. et al, "WebSphere Portal: Unified user access to content, applications and services," IBM Systems Journal, IBM Corporation, Armonk, NY, Apr. 26, 2004, pp. 420-429.

* cited by examiner

*Primary Examiner* — Linh K Pham
(74) *Attorney, Agent, or Firm* — Steven L. Nichols; Van Cott, Bagley, Cornwall & McCarthy, P.C.

(57) ABSTRACT

The present invention relates to the field of network computing, and in particular to Web contents accessible via a portal. It particularly relates to a method and system for restoring content represented by time-dependently varied fragments of portlets aggregated in web pages of such web portal.
It is proposed to enable a user to set a portlet into a "content recovery mode". A respective user action on a respective GUI control (50) creates a URI that allows the portlet to generate its output as currently seen. The user may then send this URL to a friend, who can access the desired portlet output at any given time. Or, the user may save it at the own computer.

9 Claims, 4 Drawing Sheets

PRIOR ART
PORTAL SERVER

INVENTIONAL
PORTAL SERVER

CONTENT RECOVERY MODE FOR PORTLETS

FIELD OF THE INVENTION

The present invention relates to the field of network computing, and in particular to Web contents accessible via a portal. It particularly relates to a method and system for restoring content displayed by time-dependently varied fragments of portlets aggregated in web pages of such web portal.

DESCRIPTION AND DISADVANTAGES OF PRIOR ART

Prior art web portals are for example described in an article in IBM Systems Journal, Vol. 43, No. 2, 2004, entitled "WebSphere portal: Unified user access to content, applications and services." This article is also published on the web at: http://www.research.ibm.com/journal/sj/432/will.html FIG. 1 gives a schematic system view of a web server implementing such a prior art web portal.

A prior art portal is built by a complex arrangement of functions implemented on a network server, such as web server 100. The most important such functions are logic components for user authentication (105), state handling (110), aggregation (115) of fragments and portlets (120), further described below. These components are provided in respective pages 125 with a respective plurality of APIs 130 to a respective portlet container software 135 for setting them into the common web page context, and some portal storage resources 140. The logic components are operatively connected such that data can be exchanged between single components as required. This is roughly depicted in FIG. 1.

In more detail, the portal server in FIG. 1 implements an aggregation of portlets 120 based on the underlying portal model and portal information such as security settings, user roles, customization settings, and device capabilities. Within a rendered page, the portal automatically generates the appropriate set of navigation elements based on the portal model.

The portal server invokes portlets during the aggregation as required and uses caching to reduce the number of requests made to portlets. The prior art IBM WebSphere portal employs open standards such as the Java portlet API (application programming interface). It also supports the use of a remote portlet via the WSRP standard.

The portlet container 135 provides the runtime environment for portlets. It provides facilities for event handling, inter-portlet messaging, and access to portlet instance and configuration data, among other portal resources 140 are in particular the portlets themselves and the pages on which they are aggregated in the form of an aggregation of fragments.

With reference to the focus of the present invention, a portal aims to provide an application that provides a secure, single point of interaction with diverse information, business processes, and people, personalized to a user's needs and responsibility.

The portal products offered today employ portal architectures where a portal itself only implements standard functionality like security, authorization, authentication, aggregation, caching, user management, enrollment, rendering and so on and provides the infrastructure for application components. This architecture includes APIs for the integration of applications so that applications from different partners can be used as long as they match the portal product's API. In the portal environment, these applications are typically called portlets.

Portlets are pluggable components that can be added to portals and are designed to run inside a portal's portlet container. Portlets may provide different functions ranging from simple rendering of static or dynamic content to application functions such as e-mail, calendar, etc.; portlets are invoked indirectly via the portal application and produce content that is suited for aggregation in pages. For example, portlets should produce mark-up fragments adhering to guidelines that assure that the content generated by different portlets can be aggregated into one page. Typically, portlets run on the portal server, processing input data and rendering content locally.

The portal realizes a request/response communication pattern, i.e. it waits for client requests and responds to these requests. A client request message includes a URL/URI that addresses the requested page.

The before-mentioned aggregation logic includes all steps that are required to assemble a page that is sent back to the client. Typically, these steps are to load a topology tree from storage, to traverse it and to call the instances referenced in the tree to obtain their output, which is assembled into a single page. The topology tree may be defined as the relationship as well as the arrangement of the components that are used to create the visual representation of the content. The topology tree may be defined through portlet customization by the administrators or users and saved in the database, or by other ways to create/modify the tree, e.g. scripting, xml import, etc.

Most prior art portals contain a navigation component that provides the possibility to nest elements and to create a navigation hierarchy, a Container component that allows to group and arrange portlets, and a portlet component that contains the portlets.

An important activity in the rendering and aggregation processes is the generation of URLs that address portal resources, e.g. pages. A URL is generated by the aggregation logic and includes coded state information.

The aggregation state as well as the portlet state are managed by the portal. Aggregation state can include information like the current selection including the path to the selected page in the navigation model, the expansion state of the navigation nodes, the portlet's modes and states, the portlet's render and action parameters, etc. By including the aggregation state in a URL, the portal ensures that it is later able to establish the navigation and presentation context when the client sends a request for this URL.

A portlet can request the creation of a URL through the portlet API and provide parameters, i.e., said portlet render and action parameters to be included in the URL.

A portlet mode indicates the function a portlet is performing. Normally, portlets perform different tasks and create different content depending on the function they are currently performing. A portlet mode advises the portlet what task it should perform and what content it should generate. The prior art portlet specification (JSR 168) defines the following three portlet modes: VIEW, EDIT, and HELP.

Portlets 140 generate dynamic content that is addressed through a unique resource locator (URL), or identifier (URI), between which no distinction is useful in the present disclosure's context. With reference to the focus of the present invention a URL can be bookmarked to access a referenced portlet at a later point in time. When the portlet is accessed at that later time through the bookmarked URL, the output of the portlet might differ from the time when the URL was first recorded, as the output is dynamically generated and changed, etc.

Consider for example a news portlet that shows the current headlines. The user sees an interesting article and wants to share this information with a friend. He sends to the friend via email the URL that displayed the portlet output. His friend may be assumed to invoke the URL several days later and then cannot see the headline the original sender intended, because the news portlet shows different headlines. News update cycles are in the range of some hours or even several minutes in some cases.

To avoid the above problem, the prior art is restricted to user controllable efforts like making a print-out of the interesting content, or copying content into memory and pasting it into a mail, or capturing the actual screen image and rendering the content by a pixel based storage. These prior art options are quite complicated to do, or include a change of media (computer to paper and back) and are sometimes not sufficiently feasible when, for example, the storage or redisplay of graphics is not supported by a copy-paste procedure, or the output is just a bitmap, which restricts a re-use of the originally depicted data.

OBJECTIVES OF THE INVENTION

It is thus an objective of the present invention to provide an improved method for restoring content displayed by time-dependently varied fragments of portlets aggregated in web pages of a web portal.

SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

The present invention discloses a method for restoring content displayed by time-dependently varied fragments of portlets aggregated in web pages of a web portal, which is characterized by the steps of:

a) exposing a user control by a web browser for activating a "store current portlet content" function, wherein this function is related to one or more portlets aggregated on the web portal, b) in response to a user action on the control, providing an URL, i.e., generating an URL or looking up a pre-determined one, that comprises a link to a storage resource, where restore-logic and data is provided for restoring the content, which is currently displayed by the one or more portlets at the time of the user action, and c) exposing said URL to the user for further use by the user.

The logic of steps a) to c) may be provided preferably by the portlet itself.

Thus, a user may set a portlet into a "content recovery mode". This user action causes the portlet to generate and store its output as currently seen into a URL, or the output can be stored locally and a URL generated that links to the stored output. The user may then send this URL to a friend, who can then use it to view the content at any later time.

In a first embodiment, the portlet stores the necessary information to reconstruct its original output in the URL or URI. The URI contains information for the portal system to be able to generate the desired content. The URI if invoked by the recipient will initiate a portal request processing. The URI in question will encode the portlet mode and, if issued by the client, the portal server will process the incoming request, part of which is the URI. Only invoking such URIs will generate the desired output (if all required constraints are fulfilled, such as the user having permissions to view the involved page and portlet). Portlets can be switched to different modes through the portlet API. In the user interface different modes may be represented through graphical elements which when clicked issue a request to the portal server through the client. The request contains a URI which contains the desired portlet mode. This allows the user to switch from the content recovery mode to any other available portlet mode.

The portlet indicates visually or by other means (e.g. voice output through VoiceXML) that it is in "content recovery mode".

If the content is stored and a respective URL is generated exclusively in response to said user-action, then a solution is provided that occupies storage resources only in those cases when it is really required by a page visitor.

The content may alternatively be pre-stored and a respective pre-calculated URL may be generated independently of a user action. This is recommended for example in cases, where frequent user accesses are to be expected, for example in a news portlet displaying an important event.

Further, the user control exposed to the user may also be expanded in its functionality enabling a user-initiated selection of one or more of multiple preceding content states. This may for example be attractive in situations where a historic development might be of interest to the user. Then, for example the content of Nov. 1, 3 and 5, 2004 can be made accessible for the user.

Further, preferably, a storage manager component operatively coupled to the portal server may manage a short-term and a long-term storage resource, and content already stored in said short-term storage resource may be moved to the long-term storage resource after being resident for a predetermined time in the short term storage. This opens up more flexibility and user comfort in the storage strategy, as relatively expensive storage can be used for short terms and cheaper storage used for long-term storage.

Further, before rendering the stored content to a third person, it is proposed to verify the access rights of the third person.

The above steps and features may preferably be implemented as an additional portlet modes added to pre-existing portlet modes provided by the JSR 168 standard

BRIEF DESCRIPTION OF THE DRAWINGS

The present invention is illustrated by way of example and is not limited by the preferred embodiment shown in the figures of the drawings in which.

DETAILED DESCRIPTION OF THE PREFERRED EMBODIMENT

With general reference to the figures and with special reference now to FIG. 2, the novel system additionally comprises a content restore service component 200, which has the functionality to enable a user to retrieve a current portlet state at a later point in time.

Component 200 generates a URL, which points to the resource hosting the desired current portlet content. A sample URL may look as follows:

http://localhost:9081/wps/myportal/!ut/p/kcxml/04Sj9S
Pykssy0xPLMnMz0vM0YQjzKLN4g3cwTJgFjGpvqRq
CKOcAFfjzcVKBwpDmQ7xakH5WTmp6YXKkfmqcflpu
Z15mbWZWaouH6BfkBsaUV6c6ggAhgLQRQ!!/delta/
base64xml/L0lJWWtpQ2xDbEEhIS9JRGpBQUFQUFDSk
FBTXpLeW14Zy80SVVHU11RcU5HVEM0Q0EhLzZf
MF82QS83XzBfR1Mvdg!!

As this URL is quite illegible the state encoded according to the invention in this URL can also be represented in an XML format as follows:

```
<xml version="1.0" encoding="UTF-8">
<root>
    <state type="navigational">
        <selection selection-node="6_0_6A">
            <mapping src="6_0_35" dst="6_0_6A"/>
            <mapping src="6_0_A" dst="6_0_6A"/>
        </selection>
        <theme-template>Home</theme-template>
        <portlet id="7_0_FR" portlet-type="legacy">
            <window-state-history>n</window-state-history>
            <window-state>minimized</window-state>
        </portlet>
        <portlet id="7_0_FS" portlet-type="legacy">
            <portlet-mode-history>v</portlet-mode-history>
            <portlet-mode>edit</portlet-mode>
        </portlet>
            <screen-template/>
    </state>
</root>
```

The state consists of several aspects, among them states and modes of portlets on the page selected with this URL.

Line 9 gives the ID of a portlet, and the enclosing elements define the portlet's state such as window state (line 11) and mode (line 15), or render parameters (not depicted in above example).

Details are described next with FIGS. 3, 4 and 5.

Figure 1:
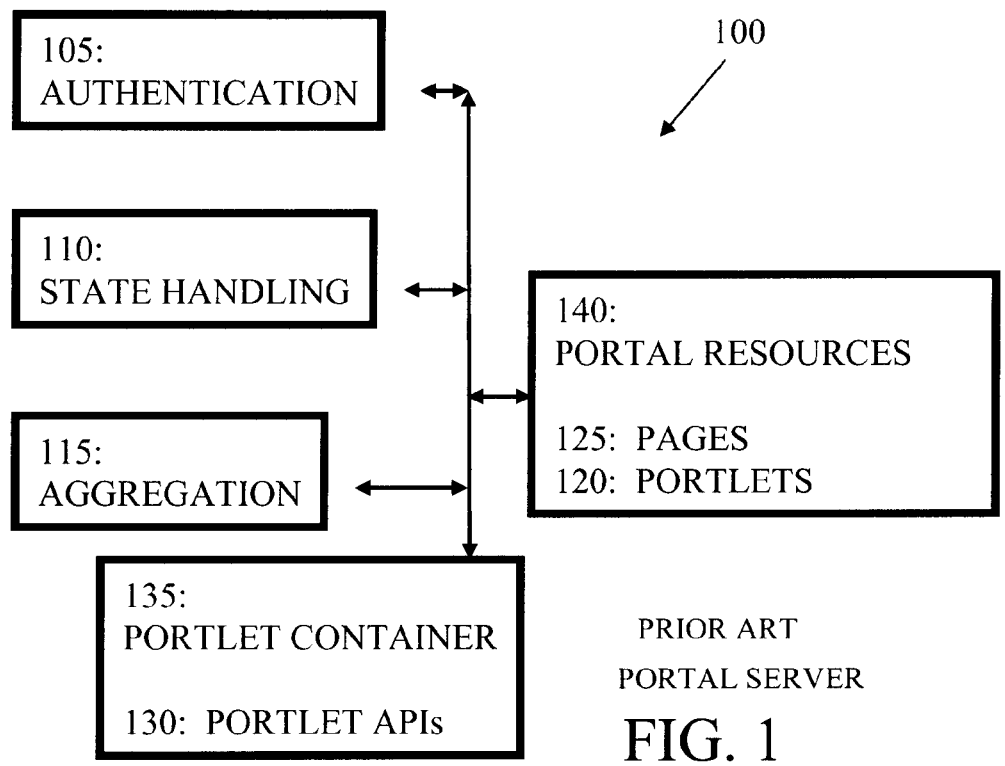
FIG. 1 is a prior art system diagram illustrating the essential components of interest in a web server.
Figure 2:
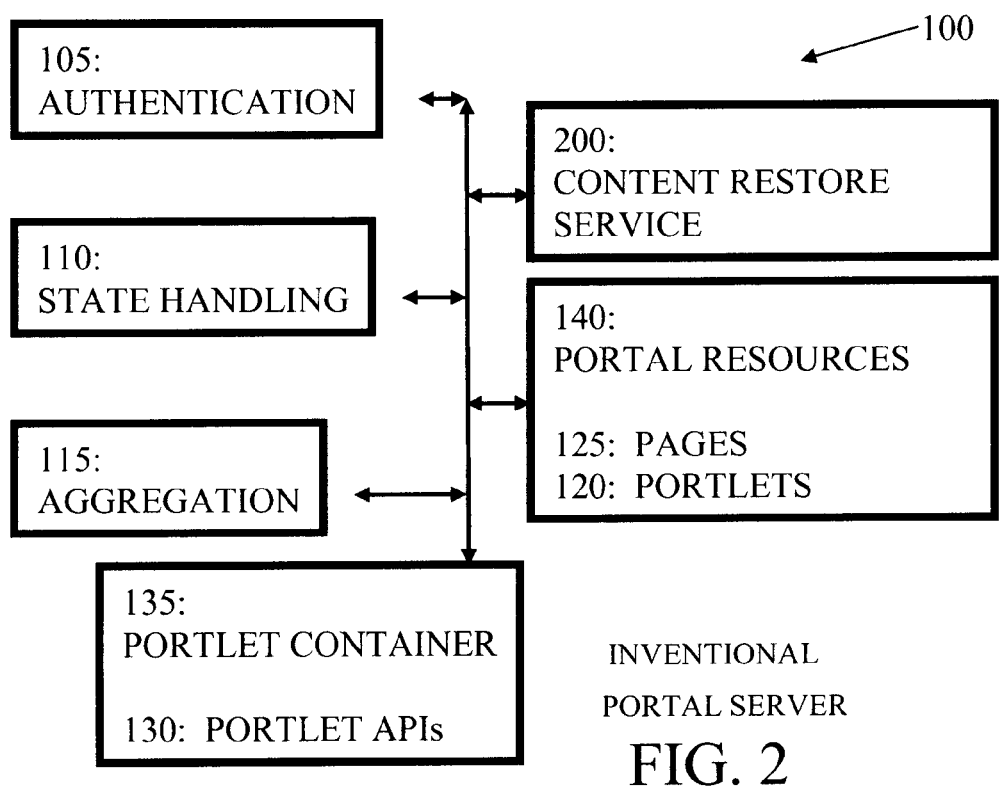
FIG. 2 is a system view enriched by the novel functionality in an overview form.
Figure 3:
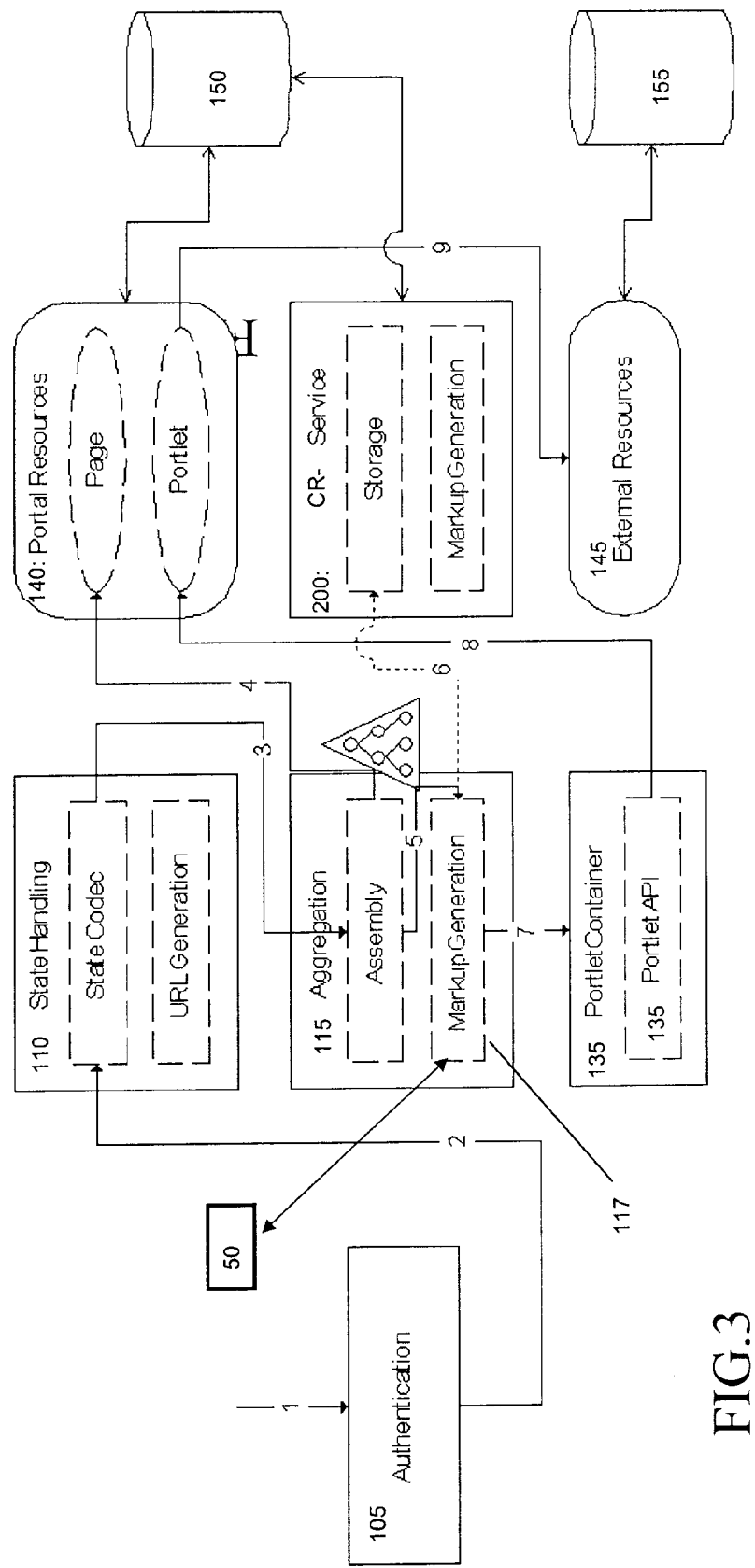
FIG. 3 is a control flow diagram depicting essential steps when applying the novel method to set portlet(s) to the before-mentioned content recovery mode.

FIG. 3 shows the control flow when a preferred embodiment of the novel method is performed in a portal according to FIG. 2.

According to the control flow depicted in FIG. 3, a request is sent to the portal (step 1). The authentication component 105 verifies that the user of this request is allowed to view portal resources as represented by the request.

Next, the state handling component 110 decodes states (step 2) as present in the URL and tracks these states during the request to generate URLs that contain the state of portal resources that may be used for the next request.

Then the aggregation component 115 assembles the resources to be displayed by building a tree of components that are to be rendered (steps 3 and 4) from information of a portal page. Once the component tree is completed, markup is generated by component 117, which represents layout information (rows, columns, other kinds of layout information) and content produced by the portlets.

The markup generation code also produces links that a user follows to interact with the portal. The URLs are generated by the state handling component.

The portlet content is retrieved from the portlet container 135 (step 7) by using the portlet API 136, which invokes the portlet code (step 8).

There are at least as many calls between the markup generation and the portlet container as there are visible portlets on the page. The portlet code itself may rely on and access external resources 145 (step 9) that usually represent back-end systems. So far, these steps are performed by the prior art.

According to this embodiment of the invention, the markup generation 117 of the aggregation component 115 includes special markup to set a particular portlet, a selection of portlets or all portlets into the novel content recovery mode. The markup generates the GUI-control 50 mentioned above to be exposed to and triggered by the user.

If the user activates the GUI-control 50, then if the involved portlet or portlets directly supports the novel content-recovery mode, the URL associated with the GUI-control will simply contain information that indicates that the portlet is in content recovery mode. If the portlet does not directly support the content recovery mode, the portal will associate the portlet content in step 6 via a content recovery service 200, abbreviated as "CR-service" in FIG. 3 with a unique key. The key may include a web page identifier, a portlet identifier and a time stamp, for example.

In this embodiment the novel content recovery service 200 uses temporary storage (such as a cache, or the user session) to store the portlet content. Any previous content under this key will be replaced in this example. The unique key information for the portlet is stored as portal state, and a link is generated that is semantically equivalent to a link as if the portlet supported the content recovery mode directly.

Figure 4:
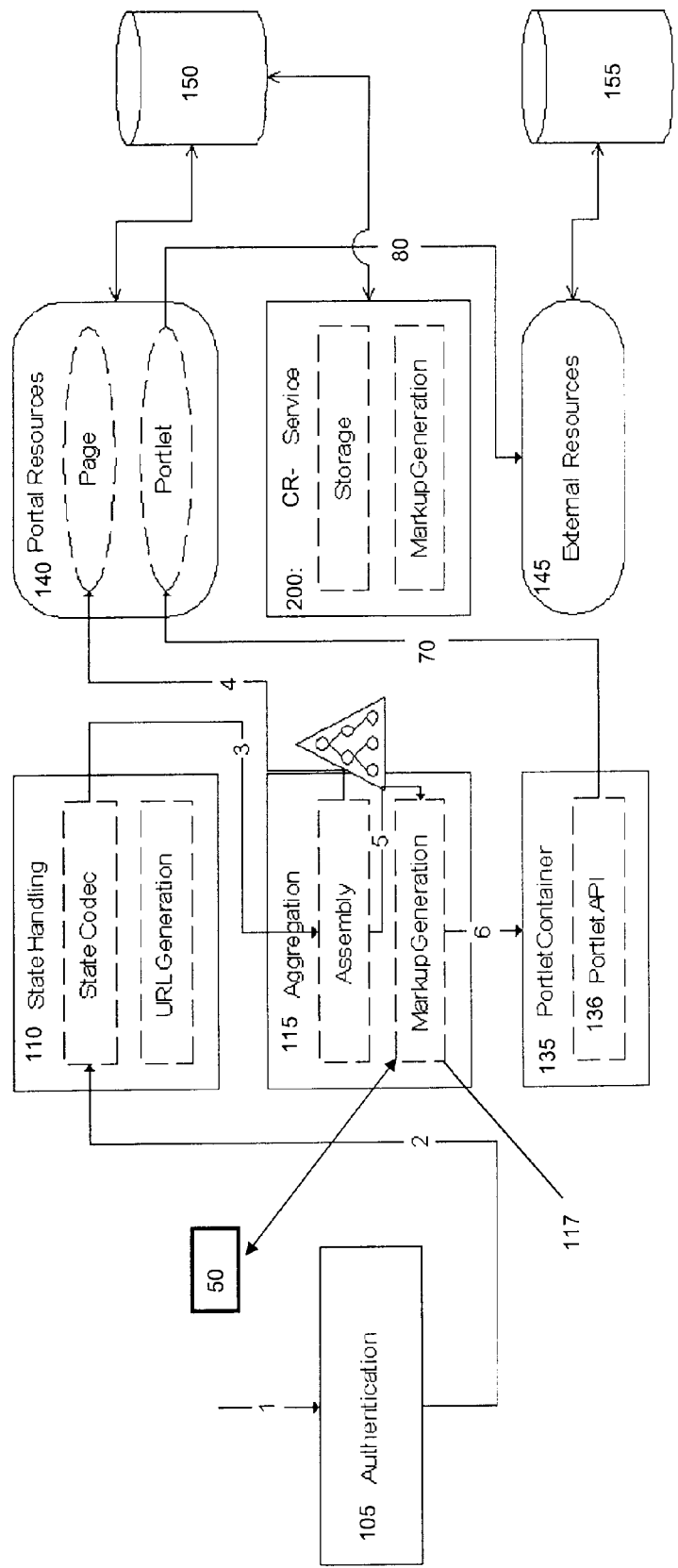
FIG. 4 is a control flow diagram depicting a request with a portlet in content recovery mode in which the portlet natively supports the content recovery mode.

FIG. 4 shows the control flow for a request with one or more portlets being in content recovery mode, where these portlets support this mode natively. The flow is performed as described for FIG. 3 until a portlet being in the novel content recovery mode is called, see step 70. The portlet creates appropriate render parameters that allow the portlet to create its output as defined by the content recovery mode. It may again use external resources 145 (a back-end) to do this, see step 80. The portlet then issues a redirect with the URL containing the render parameters through an appropriate API (e.g. JavaScript). The client (browser) follows this redirection and another portal request is processed. The URL displayed at the client now holds the URL that contains all information for the portlet to recreate its content as desired.

It should be noted that without said redirection, the URL that was generated according to FIG. 3 in component 110 would not be "stable"—it would only contain information that a portlet is in content recovery mode. Thus the URL has to state that a portlet is in content recovery mode and has to indicate which information to display.

Figure 5:
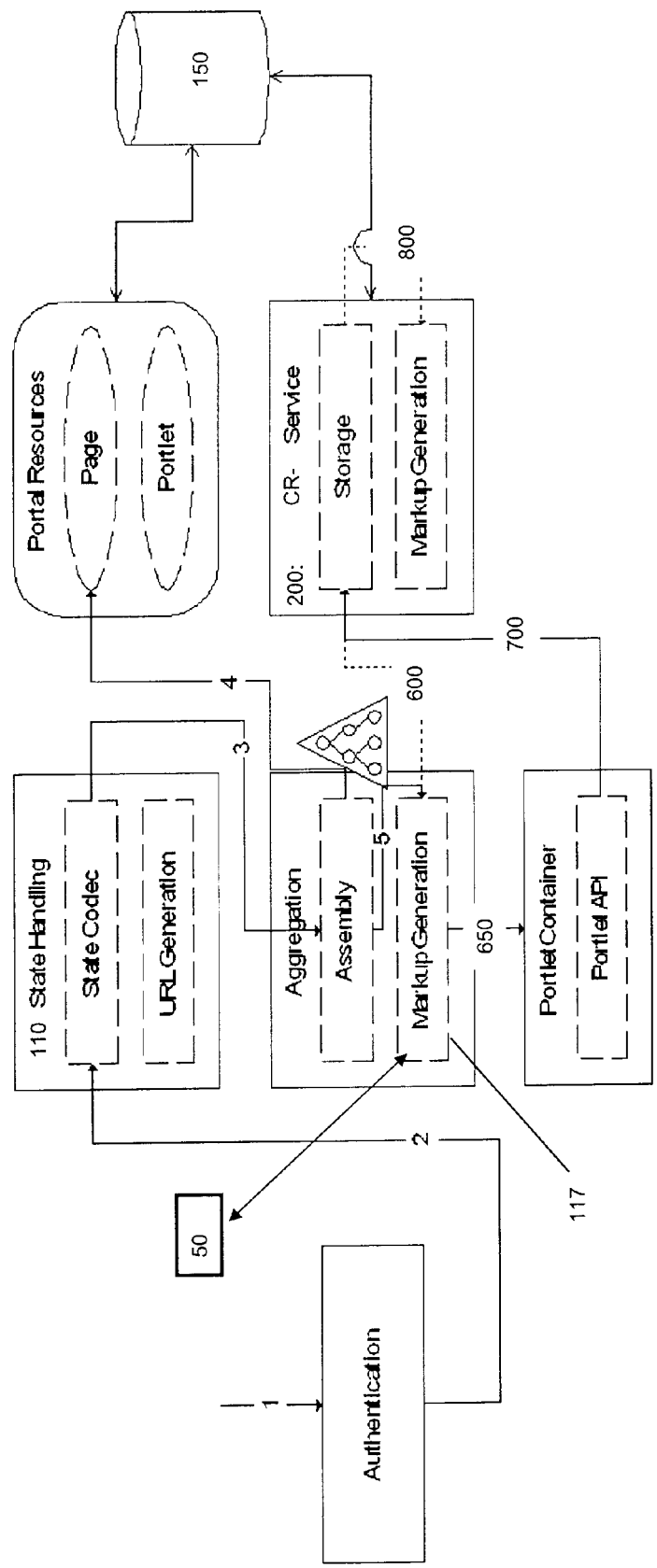
FIG. 5 is a control flow diagram depicting a request with a portlet in content recovery mode, and the portlet not natively supporting that mode.

FIG. 5 shows the respective control flow for a request with one or more portlets in content recovery mode, wherein these portlets do not support this mode natively. In this case portal-owned functionality ensures the content recovery. The flow is performed as described for FIG. 3 until the markup generation needs to include portlet content at step 5. There are two options to generate the portlet content, either by accessing the content from the content recovery service (step 600) by the Markup Generator 117, or by the portlet container at steps 650 and 700.

The portal uses the unique key for associating portlet content and asks the content recovery service for this content. If it is not available in a long-term storage, it is moved there from a short-term storage, see the description of FIG. 3. In a step 800 the markup generation of the content recovery service 200 filters the portlet content to ensure the validity of the portlet markup—especially URLs by dynamic URL rewriting—and removes or modifies URLs pointing to instable resources.

When another portal user (the above-mentioned "friend") invokes a link that was generated as described with reference to FIG. 3, 4 or 5, the authentication component 105 verifies that the user is allowed to access the portal. If the user is not yet authenticated, the user can sign on or enroll for the portal (if this functionality is available). In both cases the user is then taken to the original URL. The URL processed will contain information for the portlet, see FIG. 4, or for the portal/content recovery service, see FIG. 3, to recreate the content as described above.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and that—when loaded in a computer system from a computer usable storage medium—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A method for preserving the content of a target portlet aggregated with other portlets on a web page presented on a web portal, comprising:
   receiving a command from a user of the web page to preserve the contents of said target portlet;
   in response to receipt of said command,
      storing said contents in a storage resource location;
      accessing URL-generating code in said target portlet to generate a URL for the storage location at which said contents are stored;
      receiving the URL generated by the URL-generating code in said target portlet; and
      making the generated URL available for use by one or more users, including said user;
   wherein the contents of said target portlet that are to be preserved include both the current contents and one or more preceding content states.

2. A method according to claim 1 further comprising responding to a user request to access content stored at a location identified by the generated URL by:
   determining whether the requesting user is a user other than said user;
   in response to a determination that the requesting user is a user other than said user, authenticating said requesting user before granting access to the content stored at a location identified by the generated URL.

3. A method according to claim 1 further comprising moving said contents from the storage resource location in which it was initially stored to long term storage after a predetermined period of time.

4. A computer program product for preserving the content of a target portlet aggregated with other portlets on a web page presented on a web portal, said computer program product comprising a computer usable storage device having computer usable program code embodied therewith, said computer usable program code comprising:
   computer usable program code configured to receive a command from a user of the web page to preserve the contents of said target portlet;
   computer usable program code configured to, in response to receipt of said command, store said contents in a storage resource location;
   computer usable program code to access URL-generating code in said target portlet to generate a URL for the storage resource location at which said contents are stored;
   computer usable program code configured to receive the URL generated by the URL generating code in said target portlet; and
   computer usable program code configured to make the generated URL available for use by one or more users, including said use;
   wherein the contents of said target portlet that are to be preserved include both the current contents and one or more preceding content states.

5. A computer program product according to claim 4 further comprising computer usable program code configured to respond to a user request to access content stored at a location identified by the generated URL comprising:
   computer usable program code configured to determine whether the requesting user is a user other than said user;
   computer usable program code configured, in response to a determination that the requesting user is a user other than said user, to authenticate said requesting user before granting access to the content stored at a location identified by the generated URL.

6. A computer program product according to claim 4 further comprising computer usable program code configured to move said contents from the storage resource location in which it was initially stored to long term storage after a predetermined period of time.

7. A computer system for preserving the content of a target portlet
   aggregated with other portlets on a web page presented on a web portal, comprising:
   a storage resource;
   a computing device including a user interface logic component for receiving a command from a user of the web page to preserve the contents of said target portlet; and
   a content-restore logic component for, in response to receipt of said command, storing said contents in a storage resource location,
   accessing URL-generating code in said target portlet to generate a URL for the storage resource location at which said contents are stored;
   receiving the URL generated by the URL-generating code in said target portlet; and
   making the generated URL available for use by one or more users, including said user;
   wherein the contents of said target portlet that are to be preserved include both the current contents and one or more preceding content states.

8. A computer system according to claim 7 further comprising an authentication logic component for responding to a user request to access content stored at a location identified by the generated URL by:
  determining whether the requesting user is a user other than said user;
  in response to a determination that the requesting user is user other than said user, authenticating said requesting user before granting access to the content stored at a location identified by the generated URL.

9. A computer system according to claim 7 further comprising a storage management logic component for moving said contents from the storage resource location in which it was initially stored to long term storage after a predetermined period of time.

* * * * *